United States Patent
Subhani et al.

(10) Patent No.: US 11,091,589 B1
(45) Date of Patent: Aug. 17, 2021

(54) METHOD FOR PRODUCING A POLYMER WHICH CONTAINS DOUBLE BONDS AS AN ELASTOMER PRECURSOR

(71) Applicant: Covestro Intellectual Property GmbH & Co. KG, Leverkusen (DE)

(72) Inventors: Muhammad Afzal Subhani, Aachen (DE); Rene Boltersdorf, Güsten (DE); Walter Leitner, Aachen (DE); Thomas Ernst Mueller, Bochum (DE); Christoph Guertler, Cologne (DE); Carsten Koopmans, Hilden (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/262,859

(22) PCT Filed: Aug. 2, 2019

(86) PCT No.: PCT/EP2019/070851
§ 371 (c)(1),
(2) Date: Jan. 25, 2021

(87) PCT Pub. No.: WO2020/030538
PCT Pub. Date: Feb. 13, 2020

(30) Foreign Application Priority Data

Aug. 7, 2018 (EP) .................................. 18187627

(51) Int. Cl.
| | | |
|---|---|---|
| *C08G 64/34* | (2006.01) | |
| *C08G 64/42* | (2006.01) | |
| *C08G 64/18* | (2006.01) | |
| *C08G 64/02* | (2006.01) | |

(52) U.S. Cl.
CPC ......... *C08G 64/34* (2013.01); *C08G 64/0266* (2013.01); *C08G 64/0291* (2013.01); *C08G 64/186* (2013.01); *C08G 64/42* (2013.01)

(58) Field of Classification Search
USPC ........................................ 525/464, 477, 478
See application file for complete search history.

(56) References Cited

U.S. PATENT DOCUMENTS

| | | |
|---|---|---|
| 3,404,109 A | 10/1968 | Milgrom |
| 3,829,505 A | 8/1974 | Johnston |
| 3,941,849 A | 3/1976 | Herold |
| 5,158,922 A | 10/1992 | Hinney et al. |
| 5,470,813 A | 11/1995 | Le-Khac |
| 5,482,908 A | 1/1996 | Le-Khac |
| 5,545,601 A | 8/1996 | Le-Khac |
| 5,627,120 A | 5/1997 | Le-Khac |
| 5,712,216 A | 1/1998 | Le-Khac et al. |
| 5,714,428 A | 2/1998 | Le-Khac |
| 6,767,986 B2 | 7/2004 | Moethrath et al. |
| 6,780,813 B1 | 8/2004 | Hofmann et al. |
| 6,835,687 B2 | 12/2004 | Hofmann et al. |
| 7,008,900 B1 | 3/2006 | Hofmann et al. |
| 9,708,446 B2 | 7/2017 | Müller et al. |
| 9,957,353 B2 | 5/2018 | Müller et al. |
| 2017/0313816 A1 * | 11/2017 | Muller ................ C08G 64/183 |

FOREIGN PATENT DOCUMENTS

| | | |
|---|---|---|
| DE | 102011076687 A1 | 12/2012 |
| JP | 4145123 A | 5/1992 |
| WO | 2016046110 A1 | 3/2016 |

OTHER PUBLICATIONS

International Search Report, PCT/EP2019/070851, dated Aug. 23, 2019, Authorized officer: Michael Hoffmann.
Inoue et al., Copolymerization of Carbon Dioxide and Epoxide with Organometallic Compounds; Die Makromolekulare Chemie 130, 210-220, 1969.
Chemical Communications 47 (2011) 141-163.
Platinum Metals Review (1997), 41(2), 66.
F. Eckstorff, Y. Zhu, R. Maurer, T. E Müller, S. Scholz, J. A. Lercher, Polymer 52 (2011) 2492-2498.

* cited by examiner

*Primary Examiner* — Terressa Boykin
(74) *Attorney, Agent, or Firm* — N. Denise Brown

(57) ABSTRACT

The present invention relates to a method for producing an organooxysilyl-crosslinked polymer by reacting a polyether carbonate polyol which contains carbon-carbon double bonds with a polysiloxane compound in the presence of a suitable catalyst. Suitable polysiloxane compounds have at least two Si—H bonds. This invention also relates to organooxysilyl-crosslinked polymers which are formed by this process.

13 Claims, No Drawings

METHOD FOR PRODUCING A POLYMER WHICH CONTAINS DOUBLE BONDS AS AN ELASTOMER PRECURSOR

CROSS-REFERENCE TO RELATED APPLICATION

This application is a national stage application under 35 U.S.C. § 371 of PCT/EP2019/070851, filed Aug. 2, 2019, which claims the benefit of European Application No. 18187627, filed Aug. 7, 2018, each of which is incorporated herein by reference.

The present invention relates to a process for preparing an organooxysilyl-crosslinked polymer, comprising the reaction of a polyethercarbonate polyol containing carbon-carbon double bonds with a polysiloxane compound in the presence of a catalyst (A), wherein the polysiloxane compound has at least two Si—H bonds. A further subject is organooxysilyl-crosslinked polymers obtainable by the process of the invention.

BACKGROUND

The preparation of polyethercarbonate polyols by catalytic reaction of alkylene oxides (epoxides) and carbon dioxide in the presence of H-functional starter substances ("starters") has been the subject of intensive study for more than 40 years (e.g. Inoue et al., Copolymerization of Carbon Dioxide and Epoxide with Organometallic Compounds; Die Makromolekulare Chemie 130, 210-220, 1969). This reaction is shown in schematic form in scheme (I), where R is an organic radical such as alkyl, alkylaryl or aryl, each of which may also contain heteroatoms, for example O, S, Si, etc., and where e, f and g are each integers, and where the product shown here in scheme (I) for the polyethercarbonate polyol should merely be understood in such a way that blocks having the structure shown may in principle be present in the polyethercarbonate polyol obtained, but the sequence, number and length of the blocks and the OH functionality of the starter may vary and is not restricted to the polyethercarbonate polyol shown in scheme (I). This reaction (see scheme (I)) is highly advantageous from an environmental standpoint since this reaction is the conversion of a greenhouse gas such as $CO_2$ to a polymer. A further product formed, actually a by-product, is the cyclic carbonate shown in scheme (I) (for example, when R=$CH_3$, propylene carbonate).

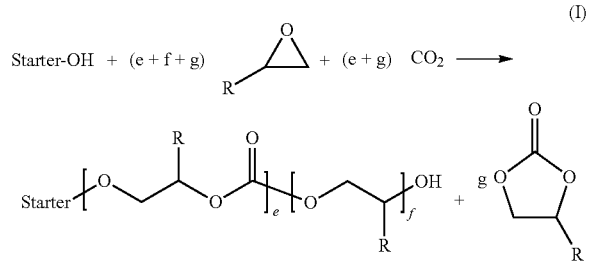

EP 2 845 872 A1 discloses a process for preparing polyethercarbonate polyols with side chains, comprising the steps of: (α) initially charging a catalyst and (αα) a suspension medium that does not contain any H-functional groups and/or (αβ) an H-functional starter compound; (γ) metering in carbon dioxide and at least two alkylene oxides, where these alkylene oxides may be the same as or different than the alkylene oxide(s) metered in in step (β), where the difference in the molecular weight of the lightest and heaviest of the alkylene oxides metered in in stage (γ) is not less than 24 g/mol and the lightest alkylene oxide is a C2-C4-alkylene oxide and where, in addition, if no H-functional starter compound has been initially introduced in step (α), step (γ) comprises the metered addition of an H-functional starter compound. Also claimed is the use of the polyethercarbonate polyol as crosslinkable component within a crosslinking reaction for production of thermoset or elastomeric networks.

Unsaturated polyethercarbonate polyols are crosslinkable via their double bonds. For instance, WO 2015/032645 A1 discloses a process for preparing mercapto-crosslinked polyethercarbonates, with reaction of polyethercarbonate polyols containing double bonds with polyfunctional mercaptans with involvement of initiator compounds.

Another conceivable crosslinking reaction is the reaction of the unsaturated polyethercarbonate polyols with free-radical initiators. However, their molecular weight achievable according to the current prior art is too low at least by a factor of 10 for use of the unsaturated polyethercarbonate polyols in the production of elastomers. This is the case especially when the double bonds in the polyurethanes prepared therefrom are to remain intact at first. Polyethercarbonate polyols cannot be processed directly on machines that are used in the production of elastomers as the currently available polyethercarbonate polyols are liquid compounds having high adhesion on metal surfaces.

It is desirable to perform the preparation of elastomers in a two-stage process. In a first step, an elastomer precursor that has still not reacted to give a fixed three-dimensional network and is therefore processible on machines and especially formable is provided. The crosslinking step that follows then affords the elastomer.

SUMMARY OF THE INVENTION

It is an object of the present invention to provide a process for preparing an elastomer precursor, in which it is possible to use currently available polyethercarbonate polyols regardless of their molecular weight, and in which good compatibility of the polyethercarbonate with fillers can be achieved without attachment via siloxane bridges.

The object was achieved in accordance with the invention by a process for preparing an organooxysilyl-crosslinked polymer, comprising the reaction of a polyethercarbonate polyol containing carbon-carbon double bonds with a polysiloxane compound in the presence of a catalyst (A), wherein the polysiloxane compound has at least two Si—H bonds.

DETAILED DESCRIPTION

Polysiloxane Compound

Polysiloxane compound in the context of the invention is understood to mean a compound containing ≥2Si—H groups. Preferred compounds are silicone oils having the general empirical formula $[R^1R^2SiO]_n$ that contain ≥2Si—H groups. The Si—H groups may be present as terminal groups (α,ω-an α,ω-poly siloxane compound), may be present along the siloxane chain or may be bound to side chains.

In a preferred embodiment of the process, the polysiloxane compound is an α,ω-polysiloxane compound.

In a preferred embodiment of the process, the α,ω-polysiloxane compound has a structure of formula (I):

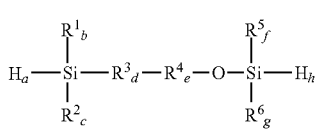
(I)

with 1≤a≤3; 1≤h≤3; a+b+c=3, f+g+h=3; $R^1$, $R^2$, $R^5$, $R^6$ independently=alkyl, aryl, cycloalkyl, preferably alkyl, more preferably Me, Et, Pr; $R^3$=O—$SiR^7R^8$; $R^7$, $R^8$ independently=alkyl, aryl, cycloalkyl, preferably alkyl, more preferably Me, Et, Pr; d=1 to 100; preferably 5 to 80; $R^4$=O—$SiR^9R^{10}$; $R^9$, $R^{10}$ independently=hydrogen, alkyl, aryl, cycloalkyl, preferably hydrogen, alkyl, more preferably hydrogen, Me, Et, Pr; e=1 to 100; preferably 5 to 80.

The $R^3$ and $R^4$ radicals here, in the above-defined repeat units d and e, may independently occur in a statistical, alternating or blockwise manner with respect to one another.

In a particularly preferred embodiment of the process, $R^1$=$R^2$=$R^3$=$R^4$=$R^5$=Me; $R^7$=$R^8$=Me; $R^9$=hydrogen; $R^{10}$=Me; d=10 to 60; e=10 to 60.

Polyethercarbonate Polyol

Unless indicated otherwise, the term "double bond" in the context of the present application means a carbon-carbon double bond that is not part of an aromatic system.

In the process of the invention, polyethercarbonate polyols are also understood to mean polyethercarbonate polyols, polyetherpolyestercarbonate polyols and/or polycarbonate polyols.

In a further configuration of the process of the invention, the polyethercarbonate polyol containing carbon-carbon double bonds has a content of carbon-carbon double bonds of 0.5% by weight to 17.0% by weight, preferably of 1.0% by weight to 6.0% by weight.

The content of carbon-carbon carbon-carbon double bonds in the polyethercarbonate polyol for the polyethercarbonate polyol containing carbon-carbon double bonds is found as the quotient of the reported double bond content of the polyethercarbonate polyols used reported in $C_2H_2$ equivalents per unit total mass of the polyethercarbonate polyol, and is reported in $C_2H_2$ equivalents per unit mass of polyethercarbonate polyol.

In a further configuration of the process of the invention, the polyethercarbonate polyol containing carbon-carbon double bonds has a $CO_2$ content of 0.5% by weight to 50% by weight, preferably of 5% by weight to 25% by weight.

In a further configuration of the process of the invention, the polyethercarbonate polyol containing carbon-carbon double bonds is obtainable by addition of an alkylene oxide, at least one monomer containing carbon-carbon double bonds and $CO_2$ onto an H-functional starter compound in the presence of a double metal cyanide catalyst.

In the process of the invention, alkylene oxides used may be alkylene oxides having 2-45 carbon atoms. The alkylene oxides having 2-45 carbon atoms are, for example, one or more compounds selected from the group comprising ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, alkylene oxides of C6-C22 α-olefins, such as 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, C1-C24 esters of epoxidized fatty acids, epichlorohydrin, glycidol, and derivatives of glycidol, for example glycidyl ethers of C1-C22 alkanols and glycidyl esters of C1-C22 alkanecarboxylic acids. Examples of derivatives of glycidol are phenyl glycidyl ether, cresyl glycidyl ether, methyl glycidyl ether, ethyl glycidyl ether and 2-ethylhexyl glycidyl ether. Alkylene oxides used are preferably ethylene oxide and/or propylene oxide, especially propylene oxide. If ethylene oxide and propylene oxide are used in a mixture, the molar EO/PO ratio is 1:99 to 99:1, preferably 5:95 to 50:50. If ethylene oxide and/or propylene oxide are used in a mixture with other unsaturated alkylene oxides, the proportion thereof is 1 to 40 mol %, preferably 2 to 20 mol %.

An example of a catalyst that may be used for preparing the polyethercarbonate polyols according to the invention is a DMC catalyst (double metal cyanide catalyst). Other catalysts may also be employed alternatively or in addition. For the copolymerization of alkylene oxides and $CO_2$, zinc carboxylates or cobalt salen complexes for example may be employed alternatively or in addition. Examples of suitable zinc carboxylates are zinc salts of carboxylic acids, especially dicarboxylic acids such as adipic acid or glutaric acid. An overview of the known catalysts for the copolymerization of alkylene oxides and $CO_2$ is provided, for example, by Chemical Communications 47 (2011) 141-163.

The catalyst is preferably a DMC catalyst.

The double metal cyanide compounds present DMC catalysts that are usable with preference in the process of the invention are the reaction products of water-soluble metal salts and water-soluble metal cyanide salts.

Double metal cyanide (DMC) catalysts for use in the homopolymerization of alkylene oxides are known in principle from the prior art (see, for example, U.S. Pat. Nos. 3,404,109, 3,829,505, U.S. Pat. Nos. 3,941,849 and 5,158,922). DMC catalysts which are described in, for example, U.S. Pat. No. 5,470,813, EP-A 700 949, EP-A 743 093, EP-A 761 708, WO 97/40086, WO 98/16310 and WO 00/47649 possess a very high activity and permit the production of polyethercarbonates at very low catalyst concentrations. Atypical example is that of the highly active DMC catalysts described in EP-A 700 949 which, as well as a double metal cyanide compound (e.g. zinc hexacyanocobaltate(III)) and an organic complex ligand (e.g. tert-butanol), also contain a polyether having a number-average molecular weight greater than 500 g/mol.

The DMC catalysts which can be used in accordance with the invention are preferably obtained by (1.) in the first step, reacting an aqueous solution of a metal salt with the aqueous solution of a metal cyanide salt in the presence of one or more organic complex ligands, e.g. an ether or alcohol, (2.) in the second step, using known techniques (such as centrifuging or filtering) to remove the solid from the suspension obtained from (a), (3.) optionally, in a third step, washing the isolated solid with an aqueous solution of an organic complex ligand (e.g. by resuspending and subsequently again isolating by filtering or centrifuging), (4.) and subsequently drying the resulting solid, optionally after pulverizing, at temperatures of in general 20-120° C. and at pressures of in general 0.1 mbar to atmospheric pressure (1013 mbar), and wherein, in the first step or immediately after the precipitation of the double metal cyanide compound (second step), one or more organic complex ligands, preferably in excess (based on the double metal cyanide compound), and optionally further complex-forming components are added.

The double metal cyanide compounds included in the DMC catalysts that are usable in accordance with the invention are the reaction products of water-soluble metal salts and water-soluble metal cyanide salts.

By way of example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparation of the double metal cyanide compounds preferably have a composition according to the general formula (II), $$M(X)_n \tag{II}$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

n is 1 if X=sulfate, carbonate or oxalate and n is 2 if X=halide, hydroxide, carboxylate, cyanate, thiocyanate, isocyanate, isothiocyanate or nitrate, or suitable metal salts preferably have a composition according to the general formula (III)

$$M_r(X)3 \tag{III}$$

where

M is selected from the metal cations $Fe^{3+}$, $Al^{3+}$, $Co^{3+}$ and $Cr^{3+}$, X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 if X=sulfate, carbonate or oxalate and r is 1 if X=halide, hydroxide, carboxylate, cyanate, isocyanate, isothiocyanate or nitrate, or suitable metal salts preferably have a composition according to the general formula (IV)

$$M(X)_s \tag{IV}$$

where

M is selected from the metal cations $Mo^{4+}$, $V^{4+}$ and $W^{4+}$,

X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

s is 2 if X=sulfate, carbonate or oxalate and s is 4 if X=halide, hydroxide, carboxylate, cyanate, thiocyanate, isocyanate, isothiocyanate or nitrate, or suitable metal salts preferably have a composition according to the general formula (V)

$$M(X)_t \tag{V}$$

where

M is selected from the metal cations $Mo^{6+}$ and $W^{6+}$,

X comprises one or more (i.e. different) anions, preferably anions selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

t is 3 if X=sulfate, carbonate or oxalate and t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparing the double metal cyanide compounds preferably have a composition according to the general formula (VI)

$$(Y)_a M'(CN)_b(A)_c \tag{VI}$$

where

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Fi^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate, and a, b and c are integers, the values for a, b and c being selected such as to ensure the electronic neutrality of the metal cyanide salt; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds included in the DMC catalysts which can be used in accordance with the invention are compounds having compositions according to the general formula (VII)

$$M_x[M'_{x'}(CN)_y]_z \tag{VII}$$

in which M is defined as in the formulae (I) to (IV) and

M' is as defined in formula (V), and x, x', y and z are integers and are selected such as to ensure the electronic neutrality of the double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). With particular preference it is possible to use zinc hexacyanocobaltate(III).

The organic complex ligands which can be added in the preparation of the DMC catalysts are disclosed in, for example, U.S. Pat. No. 5,158,922 (see, in particular, column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086. For example, organic complex ligands used are water-soluble organic compounds having heteroatoms, such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which include both aliphatic or cycloaliphatic ether groups and aliphatic hydroxyl groups (such as ethylene glycol mono-tert-butyl ether, diethylene glycol mono-tert-butyl ether, tripropylene glycol monomethyl ether and 3-methyl-3-oxetanemethanol, for example). Extremely preferred organic complex ligands are selected from one or more compounds of the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

In the preparation of the DMC catalysts that can be used in accordance with the invention, there is optional use of one or more complex-forming components from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly (N-vinylpyrrolidone-co-acrylic acid), polyvinyl methyl ketone, poly(4-vinylphenol), poly(acrylic acid-co-styrene), oxazoline polymers, polyalkyleneimines, maleic acid copolymers and maleic anhydride copolymers, hydroxyethylcellulose and polyacetals, or of the glycidyl ethers, glycosides, carboxylic esters of polyhydric alcohols, bile acids or salts, esters or amides thereof, cyclodextrins, phosphorus compounds, $\alpha,\beta$-unsaturated carboxylic esters, or ionic surface-active or interface-active compounds.

In the preparation of the DMC catalysts that can be used in accordance with the invention, preference is given to using the aqueous solutions of the metal salt (e.g. zinc chloride) in the first step in a stoichiometric excess (at least 50 mol %) relative to the metal cyanide salt. This corresponds to at least a molar ratio of metal salt to metal cyanide salt of 2.25:1.00. The metal cyanide salt (e.g. potassium hexacyanocobaltate) is reacted in the presence of the organic complex ligand (e.g. tert-butanol) to form a suspension which contains the double metal cyanide compound (e.g. zinc hexacyanocobaltate), water, excess metal salt, and the organic complex ligand.

The organic complex ligand may be present in the aqueous solution of the metal salt and/or of the metal cyanide salt or it is added directly to the suspension obtained after precipitation of the double metal cyanide compound. It has been found to be advantageous to mix the metal salt and the metal cyanide salt aqueous solutions and the organic complex ligand by stirring vigorously. Optionally, the suspension formed in the first step is subsequently treated with a further complex-forming component. This complex-forming component is preferably used in a mixture with water and organic complex ligand. A preferred process for performing the first step (i.e. the preparation of the suspension) is effected using a mixing nozzle, particularly preferably using a jet disperser, as described, for example, in WO-A 01/39883.

In the second step, the solid (i.e. the precursor of the catalyst) can be isolated from the suspension by known techniques, such as centrifugation or filtration.

In a preferred execution variant, the isolated solid is subsequently washed in a third process step with an aqueous solution of the organic complex ligand (for example by resuspension and subsequent reisolation by filtration or centrifugation). In this way, for example, water-soluble by-products, such as potassium chloride, can be removed from the catalyst that can be used in accordance with the invention. Preferably, the amount of the organic complex ligand in the aqueous wash solution is between 40% and 80% by weight, based on the overall solution.

Optionally, in the third step, the aqueous wash solution is admixed with a further complex-forming component, preferably in the range between 0.5% and 5% by weight, based on the overall solution.

It is also advantageous to wash the isolated solid more than once. In a first washing step (3.-1), washing is preferably effected with an aqueous solution of the unsaturated alcohol (for example by resuspension and subsequent reisolation by filtration or centrifugation), in order thereby to remove, for example, water-soluble by-products, such as potassium chloride, from the catalyst usable in accordance with the invention. The amount of the unsaturated alcohol in the aqueous wash solution is more preferably between 40% and 80% by weight, based on the overall solution of the first washing step. In the further washing steps (3.-2), either the first washing step is repeated one or more times, preferably from one to three times, or, preferably, a nonaqueous solution, such as a mixture or solution of unsaturated alcohol and further complex-forming component (preferably in the range between 0.5% and 5% by weight, based on the total amount of the wash solution of step (3.-2)), is employed as the wash solution, and the solid is washed with it one or more times, preferably one to three times.

The isolated and optionally washed solid can then be dried, optionally after pulverization, at temperatures of 20-100° C. and at pressures of 0.1 mbar to atmospheric pressure (1013 mbar).

One preferred method for isolating the DMC catalysts usable in accordance with the invention from the suspension by filtration, filtercake washing and drying is described in WO-A 01/80994.

For the preparation of the polyethercarbonate polyols of the invention, in addition, at least one IT-functional starter compound is used.

As suitable H-functional starter compounds (starters) it is possible to use compounds having H atoms that are active in respect of the alkoxylation. Alkoxylation-active groups having active H atoms are, for example, —OH, —NH$_2$ (primary amines), —NH— (secondary amines), —SH, and —CO$_2$H, preferably —OH and —NH$_2$, more preferably —OH. The H-functional starter substance selected may, for example, be one or more compounds from the group comprising mono- or polyhydric alcohols, polyfunctional amines, polyfunctional thiols, amino alcohols, thio alcohols, hydroxy esters, polyether polyols, polyester polyols, polyesterether polyols, polyethercarbonate polyols, polycarbonate polyols, polycarbonates, polyethyleneimines, polyetheramines (e.g. so-called Jefifamine® products from Huntsman, such as D-230, D-400, D-2000, T-403, T-3000, T-5000 or corresponding products from BASF, such as Polyetheramine D230, D400, D200, T403, T5000), polytetrahydrofurans (e.g. PolyTHF® from BASF, such as PolyTHF® 250, 650S, 1000, 1000S, 1400, 1800, 2000), polytetrahydrofuranamines (BASF product Polytetrahydrofuranamine 1700), polyetherthiols, poly acrylate polyols, castor oil, the mono- or diglyceride of ricinoleic acid, monoglycerides of fatty acids, chemically modified mono-, di- and/or triglycerides of fatty acids, and C1-C24 alkyl fatty acid esters which contain on average at least 2 OH groups per molecule. The C1-C23 alkyl fatty acid esters containing an average of at least 2 OH groups per molecule are, for example, commercial products such as Lupranol Balance® (BASF AG), Merginol® products (Hobum Oleochemicals GmbH), Sovermol® products (Cognis Deutschland GmbH & Co. KG), and Soyol® TM products (USSC Co.).

Monofunctional starter compounds used may be alcohols, amines, thiols, and carboxylic acids. Monofunctional alcohols that may be used include: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. Monofunctional thiols that may be used include: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Examples of polyhydric alcohols suitable as H-functional starter substances are dihydric alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol; 1,8-octanediol, 1,10-decanediol, 1,12-dodecanediol, bis(hydroxymethyl)cyclohexanes (such as, for example, 1,4-bis(hydroxymethyl) cyclohexane), triethylene glycol, tetraethylene glycol, polyethylene glycols, dipropylene glycol, tripropylene glycol, polypropylene glycols, dibutylene glycol and polybutylene glycols); trihydric alcohols (such as, for example, trimethylolpropane, glycerol, trishydroxyethyl isocyanurate, castor oil); tetrahydric alcohols (such as, for example, pentaerythritol); polyalcohols (such as, for example, sorbitol, hexitol, sucrose, starch, starch hydrolyzates, cellulose, cellulose hydrolyzates, hydroxy-functionalized fats and oils, especially castor oil), and also all modification products of these aforementioned alcohols with different amounts of ε-caprolactone.

The H-functional starter substances may also be selected from the substance class of the polyether polyols, especially those having a molecular weight $M_n$ in the range from 100 to 4000 g/mol.

Preference is given to polyether polyols formed from repeat ethylene oxide and propylene oxide units, preferably having a proportion of propylene oxide units of 35% to 100%, more preferably having a proportion of propylene oxide units of 50% to 100%. These may be random copolymers, gradient copolymers, alternating copolymers or block copolymers of ethylene oxide and propylene oxide.

Suitable poly ether polyols constructed from repeating propylene oxide and/or ethylene oxide units are, for example, the Desmophen®, Acclaim®, Arcol®, Baycoll®, Bayfill®, Bayflex®, Bay gal®, PET® and polyether polyols from Covestro AG (for example Desmophen® 3600Z, Desmophen®1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Bay gal® K55, PET® 1004, Polyether® SI 80). Further suitable homopolyethylene oxides are, for example, the Pluriol® E products from BASF SE, suitable homopolypropylene oxides are, for example, the Pluriol® P products from BASF SE; suitable mixed copolymers of ethylene oxide and propylene oxide are, for example, the Pluronic® PE or Pluriol® RPE products from BASF SE.

The H-functional starter substances may also be selected from the substance class of the polyester polyols, especially those having a molecular weight $M_n$ in the range from 200 to 4500 g/mol. Polyester polyols used may be at least difunctional polyesters. Polyester polyols preferably consist of alternating acid and alcohol units. Examples of acid components which can be used include succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, or mixtures of the stated acids and/or anhydrides. Examples of alcohol components used include ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol, or mixtures of the stated alcohols. If the alcohol components used are dihydric or polyhydric polyether polyols, the result is polyesterether polyols which can likewise serve as starter substances for preparation of the poly ethercarbonate polyols. Preference is given to using poly ether polyols with $M_n$=150 to 2000 g/mol for preparation of the polyesterether polyols.

H-functional starter substances used may additionally be polycarbonate diols, especially those having a molecular weight $M_n$ in the range from 150 to 4500 g/mol, preferably 500 to 2500 g/mol, which are prepared, for example, by reaction of phosgene, dimethyl carbonate, diethyl carbonate or diphenyl carbonate and difunctional alcohols or polyester polyols or polyether polyols. Examples for polycarbonates can be found, for example, in EP-A 1359177. Examples of polycarbonate diols that may be used include the Desmophen® C range from Covestro AG, for example Desmophen® C 1100 or Desmophen® C 2200.

In a further embodiment of the invention, it is possible to use polyethercarbonate polyols and/or polyetherestercarbonate polyols as H-functional starter substances. In particular, it is possible to use polyetherestercarbonate polyols. These polyetherestercarbonate polyols used as H-functional starter substances may for this purpose be prepared in a separate reaction step beforehand.

The H-functional starter substances generally have an OH functionality (i.e. the number of H atoms active in respect of the polymerization per molecule) of 1 to 8, preferably of 2 to 6 and more preferably of 2 to 4. The H-functional starter substances are used either individually or as a mixture of at least two H-functional starter substances.

Preferred H-functional starter substances are alcohols with a composition according to the general formula (VIII)
where x is a number from 1 to 20, preferably an even number from 2 to 20. Examples of alcohols of formula (VII)

are ethylene glycol, butane-1,4-diol, hexane-1,6-diol, octane-1,8-diol, decane-1,10-diol and dodecane-1,12-diol. Further preferred H-functional starter substances are neopentyl glycol, trimethylolpropane, glycerol, pentaerythritol, reaction products of the alcohols of formula (VII) with ε-caprolactone, for example reaction products of trimethylolpropane with ε-caprolactone, reaction products of glycerol with ε-caprolactone and reaction products of pentaerythritol with ε-caprolactone. Preference is further given to using, as H-functional starter compounds, water, diethylene glycol, dipropylene glycol, castor oil, sorbitol and polyether polyols formed from repeating polyalkylene oxide units.

More preferably, the H-functional starter substances are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, where the polyether polyol has been formed from a di- or tri-H-functional starter compound and propylene oxide or a di- or tri-H-functional starter compound, propylene oxide and ethylene oxide. The polyether polyols preferably have an OH functionality of 2 to 4 and a molecular weight $M_n$ in the range from 62 to 4500 g/mol and more particularly a molecular weight $M_n$ in the range from 62 to 3000 g/mol.

The $CO_2$ used in accordance with the invention must have a purity level of at least 80%, preferably of at least 95%, where the proportion of sulfur-containing impurities, such as COS or $SO_2$, must be below 1% by weight, preferably below 0.1% by weight. Preference is given to using $CO_2$ obtained as by-product in ammonia production, ethylene oxide production, by the water-gas shift reaction, in combustion processes, preferably in power plants, or in lime burning. There may be a need for subsequent purification steps in which sulfur-containing impurities in particular, but also carbon monoxide, are removed. Inert gases, such as nitrogen or argon, may be present up to a content of below 20%, preferably below 5%. Particular preference is given to using $CO_2$ which is obtained as by-product in ammonia production or is prepared by water-gas shift reaction since $CO_2$ from these sources has particularly low contents of sulfur-containing impurities.

In a further configuration of the process, the monomer containing carbon-carbon double bonds is selected from at least one of the monomers from one or more of the groups consisting of (a) allyl glycidyl ether, vinylcyclohexene oxide, cyclooctadiene monoepoxide, cyclododecatriene monoepoxide, butadiene monoepoxide, isoprene monoepoxide, limonene oxide, 1,4-divinylbenzene monoepoxide, 1,3-divinylbenzene monoepoxide, glycidyl esters of unsaturated fatty acids, such as oleic acid, linoleic acid, conjuene fatty acid, or linolenic acid, partly epoxidized fats and oils, such as partly epoxidized soya oil, linseed oil, rapeseed oil, palm oil or sunflower oil, and/or mixtures thereof.

(b) alkylene oxide with double bond of the general formula (IX):

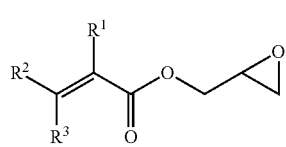

(IX)

where $R_1$ to $R_3$ are independently H, halogen, substituted or unsubstituted C1-C22 alkyl or substituted or unsubstituted C6-C12 aryl. As preferred representatives of the group of the glycidyl esters of α,β-unsaturated acids, the compounds of formula (IX) above display a substitution pattern which is particularly suitable for the synthesis of polyethercarbonate polyols having unsaturated groups. This class of compound can be reacted with high yields, by means of the DMC catalyst employable in accordance with the invention, to give polyethercarbonate polyols having unsaturated groups. Furthermore, as a result of the steric and electronic conditions in the region of the double bond, there may be good opportunities for further reaction to give higher-molecular-weight, crosslinked polyethercarbonate polyols.

(c) cyclic anhydride of the formula (X), (XI) or (XII):

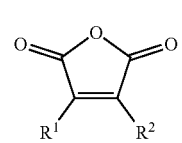

(X)

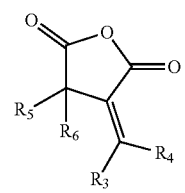

(XI)

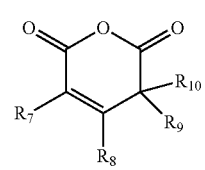

(XII)

where $R_1$ to $R_{10}$ are independently H, halogen, substituted or unsubstituted C1-C22 alkyl or substituted or unsubstituted C6-C12 aryl. Preferred compounds of the formula (IX), (X), (XI) are maleic anhydride, halogen- or alkyl-substituted maleic anhydrides, and itaconic anhydride. and (d) 4-cyclohexene-1,2-dioic anhydride, 4-methyl-4-cyclohexene-1,2-dioic anhydride, 5,6-norbornene-2,3-dioic anhydride, allyl-5,6-norbornene-2,3-dioic anhydride, dodecenylsuccinic anhydride, tetradecenylsuccinic anhydride, hexadecenylsuccinic anhydride and octadecenylsuccinic anhydride.

In a further configuration of the process, the monomer containing carbon-carbon double bonds is selected from at least one of the monomers from one or more of the groups consisting of (a) allyl glycidyl ether, vinylcyclohexene oxide and limonene oxide, (b) glycidyl acrylate and glycidyl methacrylate, (c) maleic anhydride and itaconic anhydride and (d) 4-cyclohexene-1,2-dioic anhydride and 5,6-norbornene-2,3-dioic anhydride.

In a further embodiment of the process of the invention, the monomer containing carbon-carbon double bonds is selected from maleic anhydride and/or allyl glycidyl ether, preferably allyl glycidyl ether.

The molar ratio of the saturated alkylene oxides used to the at least one further monomer containing carbon-carbon double bonds is from 55.0 mol % to 99.5 mol %, preferably from 60.0 mol % to 99.0 mol %.

The at least one further monomer containing carbon-carbon double bonds may be in a random or blockwise distribution in the polyethercarbonate polyols containing carbon-carbon double bonds. Gradient polymers can also be used.

The term "terpolymerization" in the sense of the invention comprehends the polymerization of at least one alkylene oxide, at least one further monomer containing carbon-carbon double bonds, and $CO_2$. Terpolymerization in the sense of the invention also includes, in particular, the copolymerization of a total of more than three monomers.

One preferred embodiment of the process which is usable in accordance with the invention for preparation of polyethercarbonate polyols (A-1) containing carbon-carbon double bonds is characterized in that ($\alpha$) [first activation stage] a suspension medium containing no H-functional groups, an H-functional starter compound, a mixture of a suspension medium which contains no H-functional groups and an H-functional starter compound, or a mixture of at least two H-functional starter compounds is introduced initially, and optionally water and/or other volatile compounds are removed by elevated temperature and/or reduced pressure, with the DMC catalyst being added to the suspension medium which contains no H-functional groups, the H-functional starter compound, the mixture of a suspension medium which contains no H-functional groups and the H-functional starter compound, or the mixture of at least two H-functional starter compounds, before or after the first activation stage, ($\beta$) [second activation stage] a portion (based on the total amount of the amount of alkylene oxides used in steps ($\beta$) and ($\gamma$)) of one or more alkylene oxides is added to the mixture resulting from step ($\alpha$), it being possible for the addition of a portion of alkylene oxide to take place optionally in the presence of $CO_2$ and/or inert gas (such as nitrogen or argon, for example), and it also being possible for step ($\beta$) to take place two or more times, ($\gamma$) [polymerization stage] one or more alkylene oxides, at least one unsaturated compound (alkylene oxide and/or cyclic anhydride), and carbon dioxide are metered continually into the mixture resulting from step ($\beta$), and the alkylene oxides used for the terpolymerization may be the same as or different from the alkylene oxides used in step ($\beta$).

There follows a detailed description of this preferred embodiment using the example of the polyethercarbonate polyols:

Step ($\alpha$):

The addition of the individual components in step ($\alpha$) may take place simultaneously or in succession in any order; preferably, in step ($\alpha$), the DMC catalyst is introduced first, and, simultaneously or subsequently, the suspension medium which contains no H-functional groups, the H-functional starter compound, the mixture of a suspension medium which contains no H-functional groups and the H-functional starter compound, or the mixture of at least two H-functional starter compounds is added.

A preferred embodiment provides a process in which, in step ($\alpha$) [first activation stage], ($\alpha$1) a reactor is charged with the DMC catalyst and a suspension medium and/or one or more H-functional starter compounds, ($\alpha$2) an inert gas (for example, nitrogen or a noble gas such as argon), an inert gas/carbon dioxide mixture, or carbon dioxide is passed through the reactor at a temperature of 50 to 200° C., preferably of 80 to 160° C., more preferably of 125 to 135° C., and at the same time a reduced pressure (absolute) of 10 mbar to 800 mbar, preferably of 40 mbar to 200 mbar, is set in the reactor by removal of the inert gas or carbon dioxide (with a pump, for example).

A further preferred embodiment provides a process in which, in step ($\alpha$) [first activation stage], ($\alpha$1) a suspension medium which contains no H-functional groups, an H-functional starter compound, a mixture of a suspension medium which contains no H-functional groups and an H-functional starter compound, or a mixture of at least two H-functional starter compounds is initially introduced, optionally under inert gas atmosphere, under an atmosphere of inert gas/carbon dioxide mixture, or under a pure carbon dioxide atmosphere, more preferably under inert gas atmosphere, and ($\alpha$2) an inert gas, an inert gas/carbon dioxide mixture or carbon dioxide, more preferably inert gas, is introduced into the resulting mixture of the DMC catalyst and the suspension medium which contains no H-functional groups, the H-functional starter compound, the mixture of a suspension medium which contains no H-functional groups and the H-functional starter compound, or the mixture of at least two H-functional starter compounds, at a temperature of 50 to 200° C., preferably of 80 to 160° C., more preferably of 125 to 135° C., and at the same time a reduced pressure (absolute) of 10 mbar to 800 mbar, preferably of 40 mbar to 200 mbar, is set in the reactor by removal of the inert gas or carbon dioxide (with a pump, for example), it being possible for the double metal cyanide catalyst to be added to the suspension medium which contains no H-functional groups, the H-functional starter compound, the mixture of a suspension medium which contains no H-functional groups and the H-functional starter compound, or the mixture of at least two H-functional starter compounds in step ($\alpha$1) or immediately thereafter in step ($\alpha$2).

The DMC catalyst may be added in solid form or in suspension in a suspension medium and/or in an H-functional starter compound. If the DMC catalyst is added as a suspension, it is added preferably in step ($\alpha$1) to the suspension medium and/or to the one or more H-functional starter compounds.

Step ($\beta$):

Step ($\beta$) of the second activation stage may take place in the presence of $CO_2$ and/or inert gas. Step ($\beta$) preferably takes place under an atmosphere composed of an inert gas/carbon dioxide mixture (nitrogen/carbon dioxide or argon/carbon dioxide, for example) or a carbon dioxide atmosphere, more preferably under a carbon dioxide atmosphere. The establishment of an inert gas/carbon dioxide atmosphere or a carbon dioxide atmosphere and the metering of one or more alkylene oxides may take place in principle in different ways. The supply pressure is preferably established by introduction of carbon dioxide, where the pressure (in absolute terms) is 10 mbar to 100 bar, preferably 100 mbar to 50 bar and especially preferably 500 mbar to 50 bar. The start of the metered addition of the alkylene oxide may take place at any supply pressure chosen beforehand. The total pressure (in absolute terms) of the atmosphere is set in step ($\beta$) preferably in the range from 10 mbar to 100 bar, preferably 100 mbar to 50 bar, and more preferably 500 mbar to 50 bar. Optionally, during or after the metering of the alkylene oxide, the pressure is readjusted by introduction of further carbon dioxide, with the pressure (in absolute terms) being 10 mbar to 100 bar, preferably 100 mbar to 50 bar, and more preferably 500 mbar to 50 bar.

In one preferred embodiment, the amount of one or more alkylene oxides used in the case of the activation in step ($\beta$) is 0.1% to 25.0% by weight, preferably 1.0% to 20.0% by weight, more preferably 2.0% to 16.0% by weight, based on the amount of suspension medium and/or H-functional starter compound used in step ($\alpha$). The alkylene oxide can be added in one step or stepwise in two or more portions.

In one particularly preferred embodiment of the invention, a portion (based on the total amount of the amount of alkylene oxides used in steps ($\beta$) and ($\gamma$)) of one or more alkylene oxides, in the case of the activation in step ($\beta$) [second activation stage], is added to the mixture resulting from step ($\alpha$), it being possible for the addition of a portion of alkylene oxide to take place optionally in the presence of $CO_2$ and/or inert gas. Step ($\beta$) may also take place more than once. The DMC catalyst is preferably used in an amount such that the content of DMC catalyst in the resulting polyethercarbonate polyol containing double bonds is 10 ppm to 10 000 ppm, more preferably 20 ppm to 5000 ppm and most preferably 50 ppm to 500 ppm.

In the second activation step, the alkylene oxide may be added, for example, in one portion or over the course of 1 to 15 minutes, preferably 5 to 10 minutes. The duration of the second activation step is preferably 15 to 240 minutes, more preferably 20 to 60 minutes.

Step ($\gamma$):

The metering of the alkylene oxide(s), of the unsaturated compounds, also referred to below as monomers, and of the carbon dioxide may take place simultaneously, alternately, or sequentially, and the overall amount of carbon dioxide may be added all at once or in a metered way over the reaction time. During the addition of the monomers it is possible for the $CO_2$ pressure, gradually or in steps, to be raised or lowered or left the same. The total pressure is preferably kept constant during the reaction by metered addition of further carbon dioxide. The metering of the monomers may take place simultaneously, alternately or sequentially with respect to the metering of carbon dioxide. It is possible to meter the monomers at a constant metering rate or to raise or lower the metering rate continuously or in steps, or to add the monomers in portions. The monomers are preferably added at a constant metering rate to the reaction mixture. If two or more alkylene oxides are used for synthesis of the polyethercarbonate polyols containing double bonds, the alkylene oxides may be metered in individually or as a mixture. The metered addition of the alkylene oxides can be effected simultaneously, alternately or sequentially, each via separate metering points (addition points), or via one or more metering points, in which case the alkylene oxides can be metered in individually or as a mixture. Via the nature and/or sequence of the metering of the monomers and/or of the carbon dioxide it is possible to synthesize random, alternating, blocklike or gradientlike polyethercarbonate polyols containing double bonds.

Preference is given to using an excess of carbon dioxide, relative to the calculated amount of carbon dioxide needed in the polyethercarbonate polyol containing double bonds, since an excess of carbon dioxide is an advantage, governed by the slowness of carbon dioxide to react. The amount of carbon dioxide can be specified by way of the total pressure. A total pressure (absolute) which has proven advantageous is the range from 0.01 to 120 bar, preferably 0.1 to 110 bar, more preferably from 1 to 100 bar, for the copolymerization for preparing the polyethercarbonate polyols containing double bonds. It is possible to supply the carbon dioxide to the reaction vessel continuously or discontinuously. This is dependent on the rate at which the monomers and the $CO_2$ are consumed and on whether the product is to include optionally $CO_2$-free polyether blocks or blocks with different $CO_2$ contents. The concentration of the carbon dioxide may also vary during the addition of the monomers. Depending on the reaction conditions selected, it is possible for the $CO_2$ to be introduced into the reactor in the gaseous, liquid or supercritical state. $CO_2$ can also be added to the reactor in solid form and then be converted to the gaseous, dissolved, liquid and/or supercritical state under the chosen reaction conditions.

In step ($\gamma$), the carbon dioxide can be introduced into the mixture, for example, by
(i) sparging the reaction mixture in the reactor from below,
(ii) using a hollow-shaft stirrer,
(iii) a combination of metering forms as per (i) and (ii), and/or
(iv) sparging via the surface of the liquid, by using multilevel stirring elements.

Step ($\gamma$) is conducted, for example, at temperatures of 60 to 150° C., preferably from 80 to 120° C., most preferably from 90 to 110° C. If temperatures below 60° C. are set, the reaction ceases. At temperatures above 150° C., the amount of unwanted by-products rises significantly.

The sparging of the reaction mixture in the reactor as per (i) is preferably effected by means of a sparging ring, a sparging nozzle, or by means of a gas inlet tube. The sparging ring is preferably an annular arrangement or two or more annular arrangements of sparging nozzles, preferably arranged at the bottom of the reactor and/or on the side wall of the reactor.

The hollow-shaft stirrer as per (ii) is preferably a stirrer in which the gas is introduced into the reaction mixture via a hollow shaft in the stirrer. The rotation of the stirrer in the reaction mixture (i.e. in the course of mixing) gives rise to a reduced pressure at the end of the stirrer paddle connected to the hollow shaft, such that the gas phase (containing $CO_2$ and any unconsumed monomers) is sucked out of the gas space above the reaction mixture and is passed through the hollow shaft of the stirrer into the reaction mixture.

The sparging of the reaction mixture as per (i), (ii), (iii) or (iv) can be effected with freshly metered carbon dioxide in each case and/or may be combined with suction of the gas from the gas space above the reaction mixture and subsequent recompression of the gas. For example, the gas sucked from the gas space above the reaction mixture and compressed, optionally mixed with fresh carbon dioxide and/or monomers, is introduced back into the reaction mixture as per (i), (ii), (iii) and/or (iv).

The pressure drop which comes about through incorporation of the carbon dioxide and the monomers into the reaction product in the terpolymerization is preferably balanced out by means of freshly metered carbon dioxide.

The monomers may be introduced separately or together with the $CO_2$, either via the liquid surface or directly into the liquid phase. The monomers are introduced preferably directly into the liquid phase, since this has the advantage of rapid mixing between the monomers introduced and the liquid phase, so preventing local concentration peaks of the monomers. The introduction into the liquid phase can be effected via one or more inlet tubes, one or more nozzles or one or more annular arrangements of multiple metering points, which are preferably arranged at the bottom of the reactor and/or on the side wall of the reactor.

The three steps (α), (β) and (γ) may be performed in the same reactor or each performed separately in different reactors. Particularly preferred reactor types are stirred tanks, tubular reactors and loop reactors. If the reaction steps (α), (β) and (γ) are performed in different reactors, a different reactor type can be used for each step.

Polyethercarbonate polyols containing double bonds can be prepared in a stirred tank, in which case the stirred tank, depending on design and mode of operation, is cooled via the reactor shell, internal cooling surfaces and/or cooling surfaces within a pumped circulation system. Both in semi-batchwise application, in which the product is not removed until after the end of the reaction, and in continuous application, where the product is removed continuously, particular attention should be given to the metering rate of the monomers. It should be set so that, in spite of the inhibitory effect of the carbon dioxide, the monomers are depleted sufficiently rapidly by reaction. The concentration of free monomers in the reaction mixture during the second activation stage (step β) is preferably >0% to 100% by weight, more preferably >0% to 50% by weight, very preferably >0% to 20% by weight (based in each case on the weight of the reaction mixture). The concentration of free monomers in the reaction mixture during the reaction (step γ) is preferably >0% to 40% by weight, more preferably >0% to 25% by weight, very preferably >0% to 15% by weight (based in each case on the weight of the reaction mixture).

Another possible embodiment for the copolymerization (step γ) is characterized in that one or more H-functional starter compounds as well are metered continuously into the reactor during the reaction. In the case of performance of the process in semi-batchwise operation, the amount of the H-functional starter compounds which are metered continuously into the reactor during the reaction is preferably at least 20 mol % equivalents, more preferably 70 to 95 mol % equivalents (based in each case on the total amount of H-functional starter compounds). In the case of continuous performance of the process, the amount of the H-functional starter compounds which are metered continuously into the reactor during the reaction is preferably at least 80 mol % equivalents, more preferably 95 to 99.99 mol % equivalents (based in each case on the total amount of H-functional starter compounds).

In one preferred embodiment, the catalyst/starter mixture activated in steps (α) and (β) is reacted further in the same reactor with the monomers and carbon dioxide. In another preferred embodiment, the catalyst/starter mixture activated in steps (α) and (β) is reacted further in a different reaction vessel (for example, a stirred tank, tubular reactor or loop reactor) with the monomers and carbon dioxide. In a further preferred embodiment, the catalyst/starter mixture prepared in step (α) is reacted in a different reaction vessel (for example, a stirred tank, tubular reactor or loop reactor) in steps (β) and (γ) with the monomers and carbon dioxide.

In the case of reaction in a tubular reactor, the catalyst/starter mixture prepared in step (α), or the catalyst/starter mixture activated in steps (α) and (β), and optionally further starters, and also the monomers and carbon dioxide, are pumped continuously through a tube. When a catalyst/starter mixture prepared in step (α) is used, the second activation stage in step (β) takes place in the first part of the tubular reactor, and the terpolymerization in step (γ) takes place in the second part of the tubular reactor. The molar ratios of the coreactants vary according to the desired polymer.

In one process variant, carbon dioxide is metered in in its liquid or supercritical form, in order to permit optimum miscibility of the components. The carbon dioxide can be introduced at the inlet of the reactor and/or via metering points which are arranged along the reactor, in the reactor. A portion of the monomers may be introduced at the inlet of the reactor. The remaining amount of the monomers is introduced into the reactor preferably via two or more metering points arranged along the reactor. Mixing elements, as for example are sold by Ehrfeld Mikrotechnik BTS GmbH, are advantageously installed for more effective mixing of the coreactants, or mixer-heat exchanger elements, which simultaneously improve mixing and heat removal. Preferably, the mixing elements mix $CO_2$ which is being metered in and the monomers with the reaction mixture. In an alternative embodiment, different volume elements of the reaction mixture are mixed with one another.

Loop reactors can likewise be used to prepare polyethercarbonate polyols containing double bonds. These generally include reactors having internal and/or external material recycling (optionally with heat exchanger surfaces arranged in the circulation system), for example a jet loop reactor or Venturi loop reactor, which can also be operated continuously, or a tubular reactor designed in the form of a loop with suitable apparatuses for the circulation of the reaction mixture, or a loop of several series-connected tubular reactors or a plurality of series-connected stirred tanks.

In order to achieve full conversion, the reaction apparatus in which step (γ) is carried out may frequently be followed by a further tank or a tube ("delay tube") in which residual concentrations of free monomers present after the reaction are depleted by reaction. Preferably, the pressure in this downstream reactor is at the same pressure as in the reaction apparatus in which reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 10 to 150° C. and more preferably 20 to 100° C. At the end of the post-reaction time or at the outlet of the downstream reactor, the reaction mixture preferably contains less than 0.05 wt % of monomers. The post-reaction time or the residence time in the downstream reactor is preferably 10 min to 24 h, especially preferably 10 min to 3 h.

In a further preferred embodiment of the process for preparing the polyethercarbonate polyols, the temperature in step (γ) may be not less than 60° C. and not more than 150° C. In a particularly preferred embodiment of the process, the temperature in step (γ) may be not less than 80° C. and not more than 130° C., and very preferably not less than 90° C. and not more than 120° C. This temperature range during the polymerization has proven particularly suitable for synthesis of the polyethercarbonate polyols containing unsaturated groups with a sufficient reaction rate and with a high selectivity. In the range of lower temperatures, the reaction rate which comes about may only be inadequate, and, at higher temperatures, the fraction of unwanted by-products may increase too greatly. If temperatures are selected that are too high, there may, for example, be premature crosslinking of the unsaturated groups.

The polyethercarbonate polyols containing double bonds that are obtainable in accordance with the invention preferably have an average OH functionality (i.e., average number of OH groups per molecule) of at least 1, preferably of 1.5 to 10, more preferably of ≥2.0 to ≤4.0.

The molecular weight of the resulting polyethercarbonate polyols containing double bonds is preferably at least 400 g/mol, more preferably 400 to 1 000 000 g/mol and most preferably 500 to 60 000 g/mol.

The suspension media which are used in step (α) for suspending the catalyst contain no H-functional groups. Suitable suspension media are any polar aprotic, weakly polar aprotic and nonpolar aprotic solvents, none of which contain any H-functional groups. Suspension media used may also be a mixture of two or more of these suspension media. Mention is made by way of example at this point of the following polar aprotic solvents: 4-methyl-2-oxo-1,3-dioxolane (also referred to below as cyclic propylene carbonate), 1,3-dioxolan-2-one, acetone, methyl ethyl ketone, acetonitrile, nitromethane, dimethyl sulfoxide, sulfolane, dimethylformamide, dimethylacetamide and N-methylpyrrolidone. The group of the nonpolar aprotic and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media used are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

In one alternative embodiment, suspension media used in step (α) for suspending the catalyst are one or more compounds selected from the group consisting of aliphatic lactones, aromatic lactones, lactides, cyclic carbonates having at least three optionally substituted methylene groups between the oxygen atoms of the carbonate group, aliphatic cyclic anhydrides, and aromatic cyclic anhydrides. Without being tied to a theory, suspension media of this kind are incorporated into the polymer chain in the subsequent course of the ongoing polymerization in the presence of a starter. As a result, there is no need for downstream purification steps.

Aliphatic or aromatic lactones are cyclic compounds containing an ester bond in the ring. Preferred compounds are 4-membered-ring lactones such as β-propiolactone, β-butyrolactone, β-isovalerolactone, β-caprolactone, β-isocaprolactone, β-methyl-β-valerolactone, 5-membered-ring lactones, such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered-ring lactones, such as δ-valerolactone, 1,4-dioxan-2-one, dihydrocoumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered-ring lactones, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, and lactones with higher numbers of ring members, such as (7E)-oxacycloheptadec-7-en-2-one.

Lactides are cyclic compounds containing two or more ester bonds in the ring. Preferred compounds are glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-diones, 3,6-di(but-3-en-1-yl)-1,4-dioxane-2,5-dione (in each case inclusive of optically active forms). L-lactide is particularly preferred.

Cyclic carbonates used are preferably compounds having at least three optionally substituted methylene groups between the oxygen atoms of the carbonate group. Preferred compounds are trimethylene carbonate, neopentyl glycol carbonate (5,5-dimethyl-1,3-dioxan-2-one), 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Under the conditions of the process of the invention for the copolymerization of alkylene oxides and $CO_2$, cyclic carbonates having fewer than three optionally substituted methylene groups between the oxygen atoms of the carbonate group are incorporated into the polymer chain not at all or only to a small extent.

However, cyclic carbonates having fewer than three optionally substituted methylene groups between the oxygen atoms of the carbonate group may be used together with other suspension media. Preferred cyclic carbonates having fewer than three optionally substituted methylene groups between the oxygen atoms of the carbonate group are ethylene carbonate, propylene carbonate, 2,3-butanediol carbonate, 2,3-pentanediol carbonate, 2-methyl-1,2-propanediol carbonate and 2,3-dimethyl-2,3-butanediol carbonate.

Cyclic anhydrides are cyclic compounds containing an anhydride group in the ring. Preferred compounds are succinic anhydride, maleic anhydride, phthalic anhydride, cyclohexane-1,2-dicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H,5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

In one configuration of the process of the invention, the molar ratio of the carbon-carbon double bonds in the polyethercarbonate polyol to the Si—H bonds of the poly siloxane compound is from 1:10 to 10:1, preferably from 1:5 to 5:1.

In one configuration of the process of the invention, the catalyst (A) is a hydrosilylation catalyst.

The hydrosilylation of the polyether carbonate having unsaturated groups can be induced particularly quickly and effectively by the use of platinum and palladium catalysts in a concentration of 1 to 5000 ppm, it being possible to employ homogeneous and heterogeneous catalysts. Suitable catalysts are specified in DE 102011076687. In the case of the homogeneous catalysts, preference is given to Karstedt catalysts. These are complexes of Pt(0) with compounds containing double bonds, especially vinylsilanes such as tetramethyldivinyldisiloxane or tetramethyltetravinylcyclo-tetrasiloxane. These are described, for example, in the Patinium Metals Review (1997), 41(2), 66. In addition, it is also possible to use Speier catalysts, i.e. complexes of hexachloroplatinic acid with alcohols such as isopropanol. More preferably, it is possible to use Karstedt catalysts. The heterogeneous catalysts are preferably platinum metals, more preferably platinum supported on inorganic supports or charcoal, more preferably on charcoal. It is also possible to add ligands to the heterogeneous catalysts, such as phosphines or nitrogen heterocycles, as activators or co-catalysts. One method for the hydrosilylation of alkene groups can be found, for example, in F. Eckstorff, Y. Zhu, R. Maurer, T. E. Müller, S. Scholz, J. A. Lercher, Polymer 52 (2011) 2492-2498.

In a preferred configuration of the process of the invention, the hydrosilylation catalyst is one or more compound(s) and is selected from the group consisting of Karstedt catalysts, Speier catalysts, elemental platinum and elemental platinum on a support of activated carbon or alumina.

In a preferred configuration of the process of the invention, the hydrosilylation catalyst is one or more compound(s) and is selected from the group consisting of platinum(0)-1,3-divinyl-1,1,3,3-tetramethyldisiloxane, hex-achloroplatinic acid, pentamethylcyclopentadienyl-tris(ac-etonitrile)-ruthenium(II) hexafluorophosphate, bis(1,5-cy-clooctadiene)rhodium(I) tetrafluoroborate, (bicyclo[2.2.1] hepta-2,5-diene)rhodium(I) chloride dimer, tris (triphenylphosphine)rhodium(I) chloride, benzenedichlororuthenium(II) dimer, dichloro(p-cymene) ruthenium(II) dimer and benzylidenebis(tricyclohexylphos-phine)dichlororuthenium(II).

The invention further provides an organooxysilyl-cross-linked polymer obtainable by the process of the invention, wherein the organooxysilyl end group has a number-average molecular weight Mn of ≥500 g/mol to ≤100 000 g/mol, more preferably ≥1000 g/mol to ≤50 000 g/mol, which has been determined by means of GPC. The procedure was according to DIN 55672-1: "Gel permeation chromatography, Part 1-Tetrahydrofuran as eluent" (SECurity GPC System from PSS Polymer Service, flow rate 1.0 ml/min; columns: 2×PSS SDV linear M, 8×300 mm, 5 μm; RID detector). Polystyrene samples of known molar mass were used for calibration. Polydispersity was calculated as the ratio Mw/Mn.

EXAMPLES

PET-1 difunctional poly(oxypropylene)polyol having an OH number of 112 mg$_{KOH}$/g
PO propylene oxide from Chemgas, purity >99%
AGE allyl glycidyl ether from Sigma Aldrich, purity >99%
MA maleic anhydride from Sigma Aldrich, purity >99%

The DMC catalyst was prepared according to example 6 of WO-A 01/80994.

Polysiloxane Used
Polysiloxane-1: polysiloxane from Momentive, silane (Si—H) content 0.55 mmol/g; Mn of 900 g/mol
Polysiloxane-2: polysiloxane from Momentive, silane (Si—H) content 3.80 mmol/g; Mn of 1280 g/mol Catalysts Used
Karstedt catalyst (2.0% by weight of Pt in xylene) from Sigma-Aldrich Polyoxyalkylene Polyols Used
Preparation of a Difunctional Polyoxyalkylene Polyol (Polyol-1) Containing Electron-Rich Double Bonds A 970 ml pressure reactor equipped with a gas introduction stirrer was charged with a mixture of DMC catalyst (48 mg) and PET-1 (80 g) and this initial charge was stirred at 130° C. for 30 minutes under a partial vacuum (50 mbar), with argon being passed through the reaction mixture. Following injection of 15 bar of $CO_2$, at which a slight drop in temperature was observed, and following re-establishment of a temperature of 130° C., 8.0 g of a monomer mixture (16.7% by weight of allyl glycidyl ether [corresponding to 9.3 mol %] in solution in propylene oxide) was metered in by means of an HPLC pump (1 ml/min). The reaction mixture was stirred (800 rpm) at 130° C. for 20 min. The addition of 8.0 g of the monomer mixture was repeated a second and third time. After cooling to 100° C., a further 136.0 g of the monomer mixture (16.7% by weight of allyl glycidyl ether) was metered in via an HPLC pump (1 ml/min), keeping the $CO_2$ pressure constant at 15 bar. The reaction mixture was then stirred at 100° C. for a further 1 h. The reaction was halted by cooling of the reactor with ice-water.

Characterization of the polyoxyalkylene polyol obtained by the methods specified in WO 2015032737 A1 gave an OH number of 27.2 mg$_{KOH}$/g, a $CO_2$ content of 12.79% by weight, a molecular weight $M_n$ of 4566 g/mol, a polydispersity index (PDI) of 1.33 and a double bond content of 2.2% by weight.

Preparation of a Difunctional Polyoxyalkylene Polyol (Polyol-2) Containing Electron-Deficient Double Bonds A 970 ml pressure reactor equipped with a gas introduction stirrer was charged with a mixture of DMC catalyst (70 mg) and PET-1 (80 g) and this initial charge was stirred at 130° C. for 30 minutes under a partial vacuum (50 mbar), with argon being passed through the reaction mixture. Following injection of 15 bar of $CO_2$, at which a slight drop in temperature was observed, and following re-establishment of a temperature of 130° C., 80 g of a monomer mixture (11.0% by weight of maleic anhydride [corresponding to 6.8 mol %] in solution in propylene oxide) was metered in by means of an HPLC pump (1 ml/min). The reaction mixture was stirred (800 rpm) at 130° C. for 20 min. The addition of 8.0 g of the monomer mixture was repeated a second and third time. After cooling to 100° C., a further 246.0 g of the monomer mixture (11.0% by weight of maleic anhydride in solution in propylene oxide) was metered in via an HPLC pump (1 ml/min), keeping the $CO_2$ pressure constant at 15 bar. The reaction mixture was then stirred at 100° C. for a further 1 h. The reaction was halted by cooling of the reactor with ice-water.

Characterization of the polyoxyalkylene polyol obtained by the methods specified in WO 2015032737 A1 gave an OH number of 22.4 mg$_{KOH}$/g, a $CO_2$ content of 15.92% by weight, a molecular weight $M_n$ of 5009 g/mol, a PDI of 1.9 and a double bond content of 2.2% by weight.

Methods:

For rheological determination of the gel point, a sample of the polyethercarbonate polyol was admixed with a substoichiometric amount of a polysiloxane and platinum(0)-1,3-divinyl-1,1,3,3-tetramethyldisiloxane. Shear characteristics were analyzed on a Physica MCR501 from Anton Paar equipped with PP15 measurement system. The complex moduli G' (storage modulus) and G" (loss modulus) were determined in an oscillation measurement at 90° C. and a frequency of 1 Hz, using a plate/plate configuration with a plate diameter of 15 mm, a plate-to-plate distance of 1 mm, and a 10 percent deformation. The gel point was defined as the juncture when the storage modulus and loss modulus were equal.

For the rheological determination of the gel time, a sample of the polyethercarbonate polyol was admixed with an equimolar amount of a polyisocyanate (diisocyanate and/or triisocyanate) and dibutyltin laurate (1% by weight). The complex moduli G' (storage modulus) and G" (loss modulus) were determined in an oscillation measurement at 60° C. and a frequency of 1 Hz, using a plate/plate configuration with a plate diameter of 15 mm, a plate-to-plate distance of 1 mm, and a 10 percent deformation. The gel point was defined as the juncture at which storage modulus (G') and loss modulus (G") are equal (G'/G"=1). For determination of the storage modulus (G') after 2 hours, the value of the storage modulus attained at this time, measured in Pa, was read off.

For the rheological determination of the adhesion fracture energy (bonding force), a sample of the prepolymer was applied to the measurement plate of the rheometer. The breaking force (FN) and elongation at break (d) were determined in a bonding force measurement at 30° C., using a plate-plate configuration having a plate diameter of 15 mm and a plate-to-plate distance of 0.8 mm. The sample was first pressed at a compression force of 10 N. Subsequently, the upper plate was raised at a speed of −2.5 mm/s and the breaking force (FN) was determined over the incremental distances di until the sample broke. The adhesion fracture energy was calculated by the following formula, where "r" is the radius of the upper plate (r=7.5 mm), and is reported in N/mm.

$$E_{ad} = \Sigma_i (F_{N,i} \times d_i / \pi) / (r^2 \times \pi)$$

The infrared (IR) spectroscopy measurements were effected on a Bruker Alpha-P FT-IR spectrometer; the measurements were effected in pure substance; the wavenumber of the maximum of the signal for the C=C stretch vibration is reported.

The double bond content of the prepolymers is found as the quotient of the reported double bond content of the polyethercarbonate polyols used (reported in C2H4 equivalents per unit mass of polyethercarbonate polyol), based on the total mass of the reactants used (polyethercarbonate polyol, isocyanate mixture, catalyst), and is reported in C2H4 equivalents per unit mass of prepolymer.

Example 1: Preparation of an Elastomer Precursor Using an Unsaturated Polyethercarbonate Polyol (Polyol-1) with 2.2% by Weight of Double Bonds and Polysiloxane-1 in a Molar Ratio of 4 Double Bonds (C=C):1 Silane (Si—H)

In a crimp-cap bottle, polysilane 1 (38 g) and platinum (0)-1,3-divinyl-1,1,3,3-tetramethyldisiloxane (19 mg) were blended with one another (mixture 1).

In a weighing boat, polyol-1 (500 mg) and mixture 1 (380 mg) were mixed. Subsequently, the mixture was applied to the measurement system of the rheometer and the curing characteristics were monitored at 90° C. over 120 min.

Example 2: Preparation of an Elastomer Precursor Using an Unsaturated Polyethercarbonate Polyol (Polyol-1) with 2.2% by Weight of Double Bonds (C=C) and Polysiloxane-2 in a Molar Ratio of 4 Double Bonds:1 Silane (Si—H)

In a crimp-cap bottle, polysiloxane 2 (5.6 g) and platinum (0)-1,3-divinyl-1,1,3,3-tetramethyldisiloxane (19 mg) were blended with one another (mixture 2).

In a weighing boat, polyol-1 (500 mg) and mixture 2 (56 mg) were mixed. Subsequently, the mixture was applied to the measurement system of the rheometer and the curing characteristics were monitored at 90° C. over 120 min.

Example 3 (Comp.): Preparation of an Elastomer Precursor Using an Unsaturated Polyethercarbonate Polyol (Polyol-1) with 2.2% by Weight of Double Bonds and Sulfur in a Molar Ratio of 4 Double Bonds (C=C):1 $S_8$ Unit In a weighing boat, polyol-1 (500 mg) and elemental sulfur (50 mg) were mixed. Subsequently, the mixture was applied to the measurement system of the rheometer and the curing characteristics were monitored at 90° C. over 120 min.

Analysis by means of IR spectroscopy showed the characteristic signal for double bonds at 1645 cm$^{-1}$.

Example 4 (Comp.): Preparation of an Elastomer Precursor Using an Unsaturated Polyethercarbonate Polyol (Polyol-1) with 2.2% by Weight of Double Bonds (C=C)

Polyol-1 (500 mg) supplemented with 60 ppm of catalyst was applied to the measurement system of the rheometer and the curing characteristics were monitored at 90° C. over 120 min.

Analysis by means of IR spectroscopy showed the characteristic signal for double bonds at 1645 cm$^{-1}$.

TABLE 1

| Example | Polyethercarbonate polyol | Crosslinker | Molar ratio of (C=C) to (Si—H)[a] | Gel point [s] | G' after 2 h [Pa] |
|---|---|---|---|---|---|
| 1 | Polyol-1 | Polysiloxane-1 | 4:1 | 1230 | 3380 |
| 2 | Polyol-1 | Polysiloxane-2 | 4:1 | <60 | 4900 |
| 3 (comp.) | Polyol-1 | Sulfur | | No curing | No curing | 0 |
| 4 (comp.) | Polyol-1 | — | | No curing | No curing | 0 |

Comp.: comparative example;
[a] molar ratio of the carbon-carbon double bonds (C=C) in the polyethercarbonate polyol to the Si—H bonds of the polysiloxane compound Examples 1-4 show that the crosslinking of electron-rich polyethercarbonate polyols with substoichiometrically of a polysiloxane leads to the construction of a 3D network. In this context, the reaction with siloxane-richer compounds (examples 1-2) leads to a more stable network within a shorter time. It was not possible to observe reaction with sulfur as crosslinker or without any crosslinker. Without siloxane compounds, the polyol 1 does not cure (comparative examples 3-4).

Example 5: Preparation of an Elastomer Precursor Using an Unsaturated Polyethercarbonate Polyol (Polyol-1) with 2.2% by Weight of Double Bonds and Polysiloxane-1 in a Molar Ratio of 2 Double Bonds (C=C):1 Silane (Si—H)

In a crimp-cap bottle, polysiloxane 1 (38 g) and platinum (0)-1,3-divinyl-1,1,3,3-tetramethyldisiloxane (9.5 mg) were blended with one another (mixture 3).

In a weighing boat, polyol-1 (500 mg) and mixture 3 (760 mg) were mixed. Subsequently, the mixture was applied to the measurement system of the rheometer and the curing characteristics were monitored at 90° C. over 120 min.

Example 6: Preparation of an Elastomer Precursor Using an Unsaturated Polyethercarbonate Polyol (Polyol-1) with 2.2% by Weight of Double Bonds and Polysiloxane-2 in a Molar Ratio of 2 Double Bonds (C=C):1 Silane (Si—H)

In a crimp-cap bottle, polysiloxane 2 (5.6 g) and platinum (0)-1,3-divinyl-1,1,3,3-tetramethyldisiloxane (9.5 mg) were blended with one another (mixture 4).

In a weighing boat, polyol-1 (500 mg) and mixture 4 (120 mg) were mixed. Subsequently, the mixture was applied to the measurement system of the rheometer and the curing characteristics were monitored at 90° C. over 120 min.

TABLE 2

| Example | Polyether-carbonate polyol | Crosslinker | Molar ratio of (C=C) to (Si—H)[a] | Gel point [s] | G' after 2 h [Pa] |
| --- | --- | --- | --- | --- | --- |
| 5 | Polyol-1 | Polysiloxane-1 | 2:1 | <60 | 8800 |
| 6 | Polyol-1 | Polysiloxane-2 | 2:1 | <60 | 930 |
| 4 (comp.) | Polyol-1 | — | No curing | No curing | 0 |

Comp.: comparative example;
[a] molar ratio of the carbon-carbon double bonds (C=C) in the polyethercarbonate polyol to the Si—H bonds of the polysiloxane compound Examples 5-6 show that the change in the ratio between double bond and siloxane leads to a different network density and reaction time. Given double the silane content, there is a disproportionate rise in the stability of the network formed, while there is a distinct fall in the reaction time.

Example 7: Preparation of an Elastomer Precursor Using an Unsaturated Polyethercarbonate Polyol (Polyol-1) with 2.2% by Weight of Double Bonds and Polysiloxane-1 in a Molar Ratio of 1 Double Bonds (C=C):1 Silane (Si—H)

In a crimp-cap bottle, polysiloxane 1 (38 g) and platinum (0)-1,3-divinyl-1,1,3,3-tetramethyldisiloxane (4.5 mg) were blended with one another (mixture 5).

In a weighing boat, polyol-1 (500 mg) and mixture 5 (1.52 g) were mixed. Subsequently, the mixture was applied to the measurement system of the rheometer and the curing characteristics were monitored at 90° C. over 120 min.

Example 8: Preparation of an Elastomer Precursor Using an Unsaturated Polyethercarbonate Polyol (Polyol-1) with 2.2% by Weight of Double Bonds and Polysiloxane-2 in a Molar Ratio of 1 Double Bonds (C=C):1 Silane (Si—H)

In a crimp-cap bottle, polysiloxane 2 (5.6 g) and platinum (0)-1,3-divinyl-1,1,3,3-tetramethyldisiloxane (4.5 mg) were blended with one another (mixture 6).

In a weighing boat, polyol-1 (500 mg) and mixture 6 (240 mg) were mixed. Subsequently, the mixture was applied to the measurement system of the rheometer and the curing characteristics were monitored at 90° C. over 120 min.

TABLE 3

| Example | Polyether-carbonate polyol | Crosslinker | Molar ratio of (C=C) to (Si—H)[a] | Gel point [s] | G' after 2 h [Pa] |
| --- | --- | --- | --- | --- | --- |
| 7 | Polyol-1 | Polysiloxane-1 | 1:1 | <60 | 19900 |
| 8 | Polyol-1 | Polysiloxane-2 | 1:1 | <60 | 2950 |
| 4 (comp.) | Polyol-1 | — | No curing | No curing | 0 |

Comp.: comparative example;
[a] molar ratio of the carbon-carbon double bonds (C=C) in the polyethercarbonate polyol to the Si—H bonds of the polysiloxane compound Examples 7-8 show that the change in the ratio between double bond and silane (Si—H) leads to a different network density and reaction time. In the case of a stoichiometric silane content, the stability of the network formed increases assumes a maximum.

Example 9: Preparation of an Elastomer Precursor Using an Unsaturated Polyethercarbonate Polyol (Polyol-2) with 2.2% by Weight of Double Bonds and Polysiloxane-1 in a Molar Ratio of 1 Double Bonds (C=C):1 Silane In a crimp-cap bottle, polysiloxane 1 (38 g) and platinum (0)-1,3-divinyl-1,1,3,3-tetramethyldisiloxane (4.5 mg) were blended with one another (mixture 7).

In a weighing boat, polyol-2 (500 mg) and mixture 7 (1.52 g) were mixed. Subsequently, the mixture was applied to the measurement system of the rheometer and the curing characteristics were monitored at 140° C. over 120 min.

Example 10: Preparation of an Elastomer Precursor Using an Unsaturated Polyethercarbonate Polyol (Polyol-2) with 2.2% by Weight of Double Bonds and Polysiloxane-2 in a Molar Ratio of 1 Double Bonds (C=C):1 Silane In a crimp-cap bottle, polysiloxane 2 (10.34 g) and platinum(0)-1,3-divinyl-1,1,3,3-tetramethyldisiloxane (29.21 mg) were blended with one another (mixture 8).

In a weighing boat, polyol-2 (500 mg) and mixture 8 (103.4 mg) were mixed. Subsequently, the mixture was applied to the measurement system of the rheometer and the curing characteristics were monitored at 140° C. over 120 min.

Example 11 (Comp.): Preparation of an Elastomer Precursor Using an Unsaturated Polyethercarbonate Polyol (Polyol-2) with 2.2% by Weight of Double Bonds Polyol-2 (500 mg) was supplemented with 300 ppm of catalyst and applied to the measurement system of the rheometer and the curing characteristics were monitored at 140° C. over 120 min.

Analysis by means of IR spectroscopy showed the characteristic signal for double bonds at 1645 cm$^{-1}$.

TABLE 4

| Example | Polyether-carbonate polyol | Crosslinker | Molar ratio of (C=C) to Si—H | Gel point [s] | G' after 2 h [Pa] |
|---|---|---|---|---|---|
| 9 | Polyol-2 | Polysiloxane-1 | 1:1 | 150 | 217 |
| 10 | Polyol-2 | Polysiloxane-2 | 1:1 | 6167 | 25.6 |
| 11 (comp.) | Polyol-2 | — | No curing | No curing | 0 |

Comp.: comparative example

Examples 8-9 show the influence of the silane (Si—H) content chosen on gel time and network density.

The invention claimed is:

1. A process for preparing an organooxysilyl-crosslinked polymer, comprising reacting a polyethercarbonate polyol containing carbon-carbon double bonds with a polysiloxane compound in the presence of a catalyst (A), wherein the polysiloxane compound has at least two Si—H bonds, wherein the molar ratio of the carbon-carbon double bonds in the polyethercarbonate polyol to the Si—H bonds of the polysiloxane compound is from 1:10 to 10:1.

2. The process as claimed in claim 1, wherein the polysiloxane compound comprises an α,ω-polysiloxane compound.

3. The process as claimed in claim 2, wherein the α,ω-polysiloxane compound corresponds to a structure of formula (I):

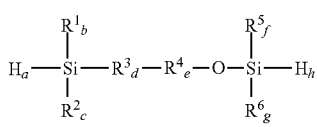

wherein
1≤a≤3;
1≤h≤3;
a+b+c=3, f+g+h=3;
$R^1$, $R^2$, $R^5$, and $R^6$ each independently represent an alkyl radical, an aryl radical, or a cycloalkyl radical;
$R^3$ represents O—SiR$^7$R$^8$;
wherein:
  $R^7$, and $R^8$ each independently represent an alkyl radical, an aryl radical, or a cycloalkyl radical;
d represents a number from 1 to 100;
$R^4$ represents O—SiR$^9$R$^{10}$;
wherein:
  $R^9$, and $R^{10}$ each independently represent a hydrogen atom, an alkyl radical, an aryl radical, or a cycloalkyl radical;
and
e represents a number from 1 to 100.

4. The process as claimed in claim 3, wherein
$R^1$, $R^2$, $R^3$, $R^4$, $R^5$ and $R^6$ each represent a methyl radical;
$R^7$, and $R^8$ each represent a methyl radical;
$R^9$-represents hydrogen;
$R^{10}$ represents a methyl radical;
d represents a number from 10 to 60;
and
e represents a number from 10 to 60.

5. The process as claimed in claim 1, wherein the polyethercarbonate polyol containing carbon-carbon double bonds is obtainable by addition of an alkylene oxide, at least one monomer containing carbon-carbon double bonds and CO2 onto an H-functional starter compound in the presence of a double metal cyanide catalyst.

6. The process as claimed in claim 5, wherein the molar ratio of the saturated alkylene oxides used to the at least one further monomer containing carbon-carbon double bonds is from 55.0 mol % to 99.5 mol %.

7. The process as claimed in claim 5, wherein the carbon-carbon double bond-containing monomer is selected from at least one of the monomers from one or more of the groups consisting of
(a) allyl glycidyl ether, vinylcyclohexene oxide, cyclooctadiene monoepoxide, cyclododecatriene monoepoxide, butadiene monoepoxide, isoprene monoepoxide, limonene oxide, 1,4-divinylbenzene monoepoxide, 1,3-divinylbenzene monoepoxide, glycidyl esters of unsaturated fatty acids, such as oleic acid, linoleic acid, conjuene fatty acid, or linolenic acid, partly epoxidized fats and oils, such as partly epoxidized soya oil, linseed oil, rapeseed oil, palm oil or sunflower oil, and/or mixtures thereof;
(b) an alkylene oxide with a double bond which corresponds to the general formula (IX):

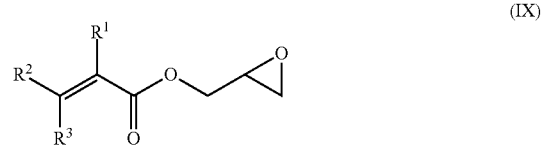

wherein:
$R^1$ to $R^3$ each independently represent H, halogen, a substituted or an unsubstituted $C_1$-$C_{22}$ alkyl radical, or a substituted or an unsubstituted $C_6$-$C_{12}$ aryl radical;
(c) a cyclic anhydride corresponding to the formula (X), (XI) or (XII):

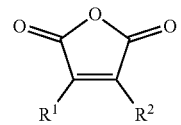

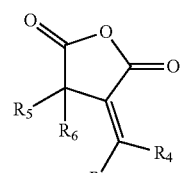

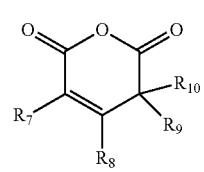

wherein
$R^1$ to $R^{10}$ each independently represent H, halogen, a substituted or n unsubstituted $C_1$-$C_{22}$ alkyl radical, or a substituted or an unsubstituted $C_6$-$C_{12}$ aryl;

and
- (d) 4-cyclohexene-1,2-dioic anhydride, 4-methyl-4-cyclohexene-1,2-dioic anhydride, 5,6-norbornene-2,3-dioic anhydride, allyl-5,6-norbornene-2,3-dioic anhydride, dodecenylsuccinic anhydride, tetradecenylsuccinic anhydride, hexadecenylsuccinic anhydride and octadecenylsuccinic anhydride.

8. The process as claimed in claim 7, wherein the carbon-carbon double bond-containing monomer is selected from at least one of the monomers from one or more of the groups consisting of
- (a) allyl glycidyl ether, vinylcyclohexene oxide and limonene oxide,
- (b) glycidyl acrylate and glycidyl methacrylate,
- (c) maleic anhydride and itaconic anhydride and
- (d) 4-cyclohexene-1,2-dioic anhydride and 5,6-norbornene-2,3-dioic anhydride.

9. The process as claimed in claim 1, wherein the polyethercarbonate polyol containing carbon-carbon double bonds has a $CO_2$ content of 0.5% by weight to 50% by weight.

10. The process as claimed in claim 1, the catalyst (A) is a hydrosilylation catalyst.

11. The process as claimed in claim 10, wherein the hydrosilylation catalyst is one or more compound(s) and is selected from the group consisting of Karstedt catalysts, Speier catalysts, elemental platinum and elemental platinum on a support of activated carbon or alumina.

12. The process as claimed in claim 10, wherein the hydrosilylation catalyst is one or more compound(s) and is selected from the group consisting of platinum(0)-1,3-divinyl-1,1,3,3-tetramethyldisiloxane, hexachloroplatinic acid, pentamethylcyclopentadienyl-tris(acetonitrile)-ruthenium (II) hexafluorophosphate, bis(1,5-cyclooctadiene)rhodium (I) tetrafluoroborate, (bicyclo[2.2.1]hepta-2,5-diene)rhodium(I) chloride dimer, tris(triphenylphosphine)rhodium(I) chloride, benzenedichlororuthenium(II) dimer, dichloro(p-cymene)ruthenium(II) dimer and benzylidenebis(tricyclohexylphosphine)dichlororuthenium(II).

13. An organooxysilyl-crosslinked polymer obtainable by a process as claimed in claim 1, wherein the organooxysilyl end group has a number-average molecular weight $M_n$ of $\geq 500$ g/mol to $\leq 100\,000$ g/mol, which has been determined by means of GPC.

* * * * *